M. T. OTIS.
FLOW REGULATOR AND SEED TRAP FOR IRRIGATING DITCHES.
APPLICATION FILED AUG. 22, 1911.
1,010,305. Patented Nov. 28, 1911.
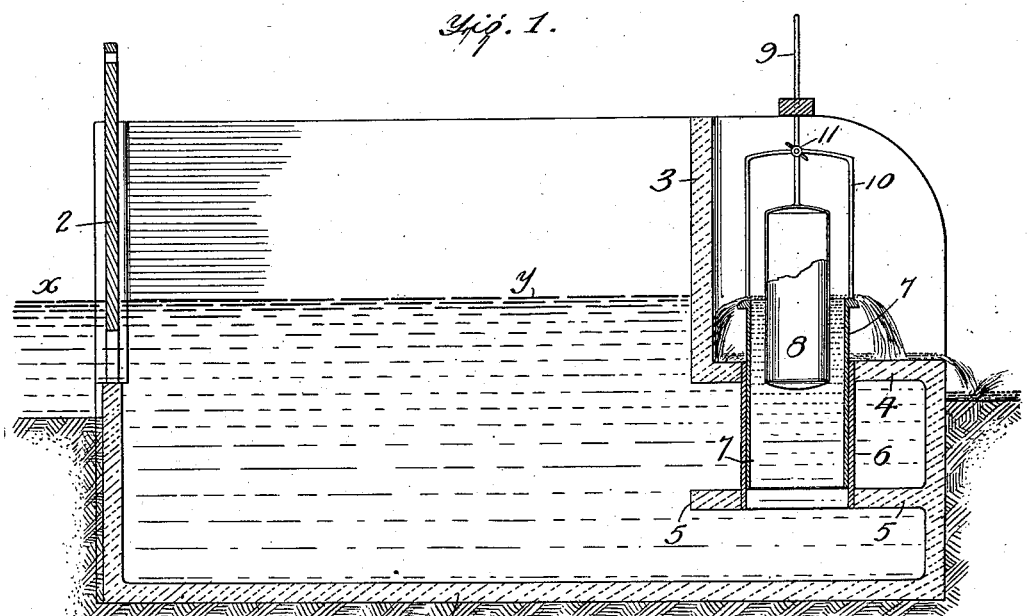
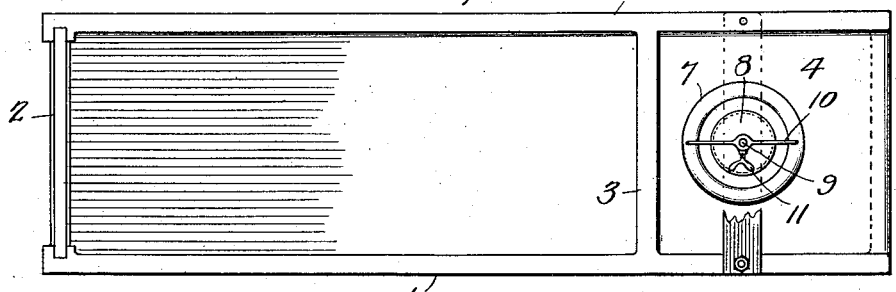
WITNESSES
INVENTOR
MARION T. OTIS,
BY
ATTORNEYS

UNITED STATES PATENT OFFICE.

MARION T. OTIS, OF HAGERMAN, IDAHO.

FLOW-REGULATOR AND SEED-TRAP FOR IRRIGATING-DITCHES.

1,010,305.  Specification of Letters Patent.  Patented Nov. 28, 1911.

Application filed August 22, 1911. Serial No. 645,335.

*To all whom it may concern:*

Be it known that I, MARION T. OTIS, a citizen of the United States, and a resident of Hagerman, in the county of Lincoln and State of Idaho, have invented an Improved Flow-Regulator and Seed-Trap for Irrigating-Ditches, of which the following is a specification.

My invention is an improved means for regulating the flow of water in irrigating ditches so that it is practically uniform, and also for preventing seeds of grass or weeds floating along with the water and thus out upon the land.

The details of construction and operation of the invention are as hereinafter described, and illustrated in the accompanying drawing, in which—

Figure 1 is a longitudinal vertical section of the apparatus. Fig. 2 is a plan view of the same, a portion being broken away.

An oblong, rectangular box or trough 1, which may be formed of cement or any other preferred material, is fixed in the ground, preferably about half its depth, and provided at one end with an opening for admission of water and a vertically slidable gate 2 for adjusting the size of said opening as may be required to regulate the inflow from a source of supply $x$ exterior to the box. The other or down-stream end of the box is provided with means for automatically regulating the discharge of water so that it is practically uniform. The construction and combination of parts for effecting this are as follows. The box 1 has a vertical partition 3, another horizontal partition 4, and another horizontal partition 5. The vertical partition 3 extends down about half the depth of the box and the horizontal partition 4, which joins the same at a right angle, is extended inward from the adjacent end of the box. The partition 5, which is parallel to partition 4, is located a short distance below it and the two are provided with openings in which is fixed a cylinder 6 that serves as a guide for an elongated cylindrical valve 7, the latter being vertically adjustable and serving as a conduit through which the water passes from the box into the irrigating ditch.

A hollow cylindrical float 8, which is of considerably less diameter than the valve 7, is arranged in the upper portion thereof, and provided with a stem 9 which passes through an opening in a metal guide 10 that is fixed to the upper end of the valve. A clamp-screw 11 is applied at the junction of the parts 9 and 10 and serves to secure the float stem at any desired point.

It is apparent that the buoyant effect of the float 8 is proportionate to its immersion in the water, or, in other words, to its adjustment higher or lower in the cylindrical valve 7. As indicated in the drawing, the float when half immersed in the water serves to hold the valve 7 raised to nearly the same height as the supply and the body of water $y$ held in the box. It is further apparent that the valve will thus rise and fall with the surface of the water at $x$, $y$, and thus the overflow from the valve will be practically uniform. If, however, it be desired to increase the amount of overflow, the float 8 is raised still higher, whereby its buoyant effect is decreased, with the result that the valve is lowered and consequently a greater amount of water overflows the same. By this simple means, that is to say, by the combination of the float and valve with the valve guide and means of adjustment, I provide a very simple yet automatic and reliable regulator for governing the flow of water from a source of supply to a point of delivery, whether it be used for irrigating or other purposes.

While the box 1 with its partitions 3, 4, 5, may be constructed of cement, the valve, valve guide, and float are preferably constructed of wood or metal.

In addition to the functions above described, the box 1 serves as a trap for the seeds of grass, weeds, or other plants which may flow along with the water delivered into the box. The gravity of the seeds carries them to the bottom of the box where they are deposited and prevented from flowing along in the current passing up through the cylindrical valve 7. The box or trough 1 being open at the top, the seeds may be readily removed whenever required.

What I claim is:—

1. The improved flow regulator, comprising a box having at its discharge end a horizontal partition provided with an opening and having a vertical guide fixed therein, a tubular valve adapted to slide in said guide, and a float connected with the valve and adapted to project into the same, as and for the purpose specified.

2. The improved flow regulator, comprising a box having at its discharge end a partition provided with an opening, a tubular valve adapted to slide vertically in the opening, a float made of less diameter than the valve and adapted for insertion therein, and means for holding the float in adjustable relation to the valve as required to regulate the height of the valve and thus govern the rate of overflow, substantially as described.

3. In a flow regulator, the combination with a box having a horizontal partition arranged at its discharge end and provided with an opening, a hollow open-ended valve adapted to slide vertically in said opening, a float of less diameter which projects into the valve more or less, and means for adjustably connecting it with the valve, whereby it may be raised or lowered according to the amount of water to be discharged from the box, substantially as described.

4. In a flow regulator, the combination of a box for receiving water, the same having at its discharge end two parallel horizontal partitions separated vertically and provided with coincident openings, a cylindrical guide held in said openings and thus connecting the two partitions, a cylindrical valve adapted to slide vertically in said guide, a cylindrical float arranged in the upper portion of the valve and adapted for vertical adjustment therein, and means for supporting and holding the float at different heights relative to the valve, substantially as described.

MARION T. OTIS.

Witnesses:
 ELMER COOK,
 LYDIA COOK.

---

Copies of this patent may be obtained for five cents each, by addressing the "Commissioner of Patents, Washington, D. C."